(12) United States Patent
Xia et al.

(10) Patent No.: US 8,190,024 B2
(45) Date of Patent: May 29, 2012

(54) SYSTEMS AND METHODS FOR WAVELENGTH SCANNING OF IN-SERVICE WAVELENGTH DIVISION MULTIPLEXING SYSTEMS

(75) Inventors: Tiejun J. Xia, Richardson, TX (US); Glenn A. Wellbrock, Wylie, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 1019 days.

(21) Appl. No.: 12/118,969

(22) Filed: May 12, 2008

(65) Prior Publication Data
US 2009/0279887 A1    Nov. 12, 2009

(51) Int. Cl.
*H04B 10/08* (2006.01)
*H04B 17/00* (2006.01)

(52) U.S. Cl. ............ 398/34; 398/9; 398/16; 398/25; 398/30; 398/31; 398/32; 398/33; 398/38

(58) Field of Classification Search .......... 398/9–38
See application file for complete search history.

(56) References Cited

U.S. PATENT DOCUMENTS

| | | | |
|---|---|---|---|
| 6,690,884 B1 * | 2/2004 | Kelty et al. | 398/27 |
| 7,127,169 B1 * | 10/2006 | Liu et al. | 398/82 |
| 7,711,266 B1 * | 5/2010 | Harris | 398/25 |
| 2003/0007207 A1 * | 1/2003 | Healey et al. | 359/124 |
| 2003/0123140 A1 * | 7/2003 | Tanaka | 359/341.41 |
| 2004/0039552 A1 * | 2/2004 | Moll et al. | 702/189 |
| 2005/0138490 A1 * | 6/2005 | Grimes et al. | 714/56 |
| 2008/0085115 A1 * | 4/2008 | Turukhin et al. | 398/34 |
| 2008/0108316 A1 * | 5/2008 | Joung et al. | 455/226.1 |
| 2008/0181289 A1 * | 7/2008 | Moll | 375/224 |
| 2009/0213844 A1 * | 8/2009 | Hughston | 370/352 |

\* cited by examiner

*Primary Examiner* — Nathan Curs
*Assistant Examiner* — Tanya Ngo (57) ABSTRACT

A testing input module for testing an in-service WDM system is provided. The testing input module includes a first light source configured to emit a first light signal to one or more empty channels of the in-service WDM system; and a tunable second light source configured to emit a second light signal to test the one or more empty channels. The testing input module also includes a first switch module configured to: receive from the first light source and output the first light signal during a first time interval; and receive from the second light source and output the second light signal during a second time interval. The second time interval is a duration wherein a channel power monitoring function of the in-service WDM system is not triggered.

19 Claims, 7 Drawing Sheets

Figure 5

SYSTEMS AND METHODS FOR WAVELENGTH SCANNING OF IN-SERVICE WAVELENGTH DIVISION MULTIPLEXING SYSTEMS

BACKGROUND INFORMATION

Conventional systems and methods typically test Wavelength Division Multiplexing ("WDM") systems by performing wavelength scanning of the channels in the WDM system while the WDM system is out of service. In order to test in-service WDM systems, i.e., those in the field, one or more channels are typically taken out of service thereby reducing the efficiency of the system. Additionally, a channel may have a noticeable change in power when wavelength scanning is performed on the channel. The change in power may occur because the scanning nature of the signal may cause the signal to be inside of the channel at a first time and slightly or severely outside of the channel at a second time. The optical amplifiers may have a channel power monitoring function that monitors the power in one or more channels and adjusts the amplifier gain to compensate for a change in power. Accordingly, because the power of the channel being scanned may vary, optical amplifiers in the WDM system may rapidly and/or repeatedly adjust gain to compensate for the change in power thereby possibly resulting in system instability. Further, upon determining that a channel does not have at least a minimum amount of power, the optical amplifier may block the channel to reduce interference to other WDM channels performing data transmission or reception. Blocking the channel may reduce the efficiency of the system.

Additionally, conventional systems and methods for performing tests that require multiple channels to be tested have not performed the testing simultaneously over the channels. Conventional approaches to testing multiple channels includes taking a channel out of service, performing wavelength scanning on the channel, measuring the output of the channel, and repeating the process with another channel. The measured outputs are then averaged. This approach to testing multiple channels may result in unreliable measurements because the tests are not performed simultaneously.

BRIEF DESCRIPTION OF THE DRAWINGS

Purposes and scope of exemplary embodiments described below will be apparent from the following detailed description in conjunction with the appended drawings in which like reference characters are used to indicate like elements, and in which.

DETAILED DESCRIPTION OF EXEMPLARY EMBODIMENTS

In exemplary embodiments, systems, modules and methods for wavelength scanning of in-service WDM systems are provided.

In exemplary embodiments, a testing input module may be provided. The testing input module may include a first light source configured to emit a first light signal to one or more empty channels of an in-service WDM system. The testing input module may also include a tunable second light source configured to emit a second light signal to the one or more empty channels to test the one or more empty channels. The testing input module may also include a first switch module configured to receive from the first light source and output to the one or more empty channels, the first light signal during a first time interval. The first switch module may also be configured to receive from the second light source and output to the one or more empty channels, the second light signal during a second time interval. The second time interval may be a duration wherein a channel power monitoring function of the in-service WDM system is not triggered. In exemplary embodiments, the first light signal may be configured with a minimum amount of power such that the channel receiving the first light signal may become or remain unblocked by the optical amplifier.

In exemplary embodiments, an in-service WDM testing system is provided. The in-service WDM testing system may include an in-service WDM system configured to receive one or more first light signals and one or more input test signals and to output an output test signal. The in-service WDM testing system may also include a testing input module configured to output to one or more empty channels of the in-service WDM system, the one or more first light signals from a first switch module during a first time interval. The testing input module may also be configured to output to the one or more empty channels, one or more input test signals. The one or more input test signals may be output from the first switch module during a second time interval to test the one or more empty channels. The second time interval may be a duration wherein a channel power monitoring function of the in-service WDM system is not triggered. The in-service WDM testing system may also include a testing output module configured to receive and analyze the output test signal.

In exemplary embodiments, a method for providing wavelength scanning measurement is provided. The method may include: generating a first light signal; generating a second light signal; and powering on one or more switching mechanisms configured to output to one or more empty channels, a first light signal and the second light signal. The method may also include receiving by the one or more empty channels, the first light signal; and receiving by the one or more empty channels, the second light signal for testing the one or more empty channels. In exemplary embodiments, the first light signal may be received during a first time interval and the second light signal may be received during a second time interval. The first time interval and the second time interval may be non-overlapping time intervals, and the second time interval may be a duration wherein a channel power monitoring function of the one or more empty channels is not triggered.

In other exemplary embodiments, a method for testing an in-service WDM system is provided. The method may include receiving a plurality of signals at a fiber link of the in-service WDM system. At least one of the plurality of signals may be a test signal configured for testing the WDM system. The method may also include receiving an output signal indicative of the test signal and indicative of the WDM system from the fiber link. The method may also include processing the output signal to measure a parameter of the WDM system.

The description below describes systems, methods and/or modules, which may include one or more additional modules, some of which are explicitly shown in the figures and/or others that are not. As used herein, the term "module" may be understood to refer to computing software, firmware, hardware, circuitry and/or various combinations thereof. It is noted that the modules are merely exemplary. The modules may be combined, integrated, separated, and/or duplicated to support various applications. Also, a function described herein as being performed at a particular module may be performed at one or more other modules instead of or in addition to the function performed at the particular module shown. Further, the modules may be implemented across multiple devices and/or other components local or remote to one another. Additionally, the modules may be moved from one device and/or added to another device, and/or may be included in both devices.

It should be noted that although the flow chart provided herein shows a specific order of method steps, it is understood that the order of these steps may differ from what is depicted. Also two or more steps may be performed concurrently or with partial concurrence. Such variation will depend on the software and/or hardware systems chosen and/or on designer choice. It is understood that all such variations are within the scope of the exemplary embodiments. Likewise, software and/or web implementations of the exemplary embodiments could be accomplished with standard programming techniques with rule based logic and/or other logic to accomplish the various steps.

It is further noted that the figures illustrate various components as separate entities from one another. The illustration of components as separate entities from one another is merely exemplary. The components may be combined, integrated, separated and/or duplicated to support various applications. Further, the functions described as being performed at various components may be performed at other components, and/or the various components may be combined and/or separated.

Figure 1:
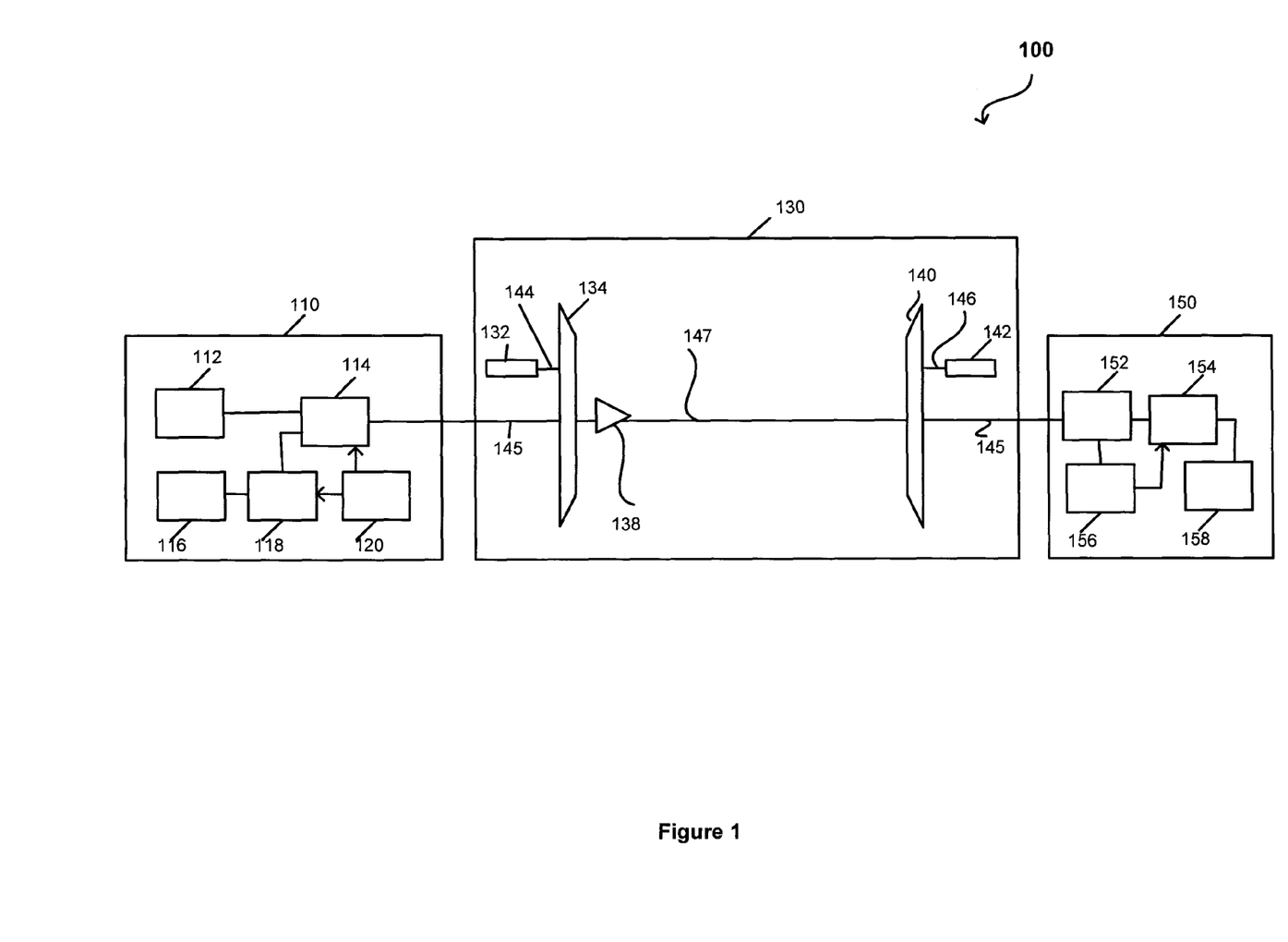
FIG. 1 is a schematic diagram of a Wavelength Division Multiplexing Testing System ("WDM-TS") in accordance with exemplary embodiments.

FIG. 1 is a schematic diagram of a WDM-TS in accordance with exemplary embodiments. It should be understood that the WDM-TS 100 shown in FIG. 1 depicts a simplified view and/or may include additional elements that are not depicted.

As used herein, the term "empty channel" shall mean a channel that is not communicatively coupled to a transmitter or receiver and that is visually dark in color because the channel is not performing data transmission or reception. As used herein, the term "lit channel" shall mean a channel that is communicatively coupled to a transmitter or receiver and that is performing data transmission or reception and therefore is lit with a color associated with the wavelength of the data being transmitted or received through the channel.

One or more parameters of an empty channel may be measured to determine the performance of the WDM system 130. Examples of parameters of an empty channel that may be measured may include, but are not limited to, chromatic dispersion, polarization mode dispersion ("PMD"), pass band shape, optical signal-to-noise radio ("OSNR"), latency and/or other parameters that measure the performance of an in-service WDM channel.

In the embodiment shown, the WDM-TS 100 may include a testing input module 110, a WDM system 130, and a testing output module 150. The testing input module 110 may be communicatively coupled to an input (not shown) of the WDM system 130 and the testing output module 150 may be communicatively coupled to an output (not shown) of the WDM system 130.

The testing input module 110 may include a first light source 112, a second light source 116, a first switch module 114, a second switch module 118 and a control module 120. An output port (not shown) of the first light source 112 may be communicatively coupled to a first input port (not shown) of the first switch module 114. An output port (not shown) of the second light source 116 and the output port (not shown) of the control module 120 may be communicatively coupled to one or more input ports (not shown) of the second switch module 118. A second input port (not shown) of the first switch module 114 may be communicatively coupled to the output port (not shown) of the second switch module 118.

In exemplary embodiments, the first light source 112 may be configured to output a first light signal having a fixed wavelength. The fixed wavelength may be a wavelength corresponding to an empty channel 145 in the WDM system 130. The intensity of the first light signal may be of a magnitude wherein, in response to receiving the first light signal, the WDM system 130 causes the empty channel 145 to become unblocked or to remain unblocked. In various embodiments, the minimum intensity of the first light signal such that the WDM system 130 causes the empty channel 145 to become unblocked or to remain unblocked varies by the design of the WDM system 130. In one embodiment, the minimum intensity of the first light signal is −2 dBm. The first light source 112 may be a mechanism configured to output continuous wave light for a first time interval. For example, the first light source 112 may be a continuous wave laser.

The second light source 116 may be a light source configured to provide a second light signal to an empty channel 145. The second light source 116 may be configured to be tuned to output light corresponding to one or more wavelengths. The second light signal may be tuned to have a wavelength corresponding to the wavelength of the first light signal after the first light signal is provided to the channel. Accordingly, the first light signal and/or the second light signal may be received on the same channel of the in-service WDM system 130. Wavelength scanning may be performed on the empty channel 145 when the empty channel 145 receives the second light signal. The second light signal may be used to test one or more parameters of the empty channel 145.

The control module 120 may be a module configured to output one or more control signals to the first switch module 114 and/or the second switch module 118 for controlling the periodic windowing function of the first switch module 114 and/or the second switch module 118. The periodic windowing function may be indicative of the time periods during which the first switch module 114 outputs the first light signal and the second light signal to the WDM system 130, and/or the time interval during which the second switch module 118 outputs the second light signal to the first switch module 114.

The first switch module 114 may be a mechanism configured to receive the first light signal and the second light signal and output the received first light signal and the received second light signal. The first switch module 114 may be an optical switch. The first switch module 114 may be a 2×1 optical switch. In this embodiment, the two input ports (not shown) may be configured to receive the output from the first light source 112 and the second switch module 118 and the output port may be configured to output to the WDM system 130 the received outputs from the first light source 112 and the second switch module 118. The first switch module 114 may be controlled to receive the first light signal and/or the second light signal and output the same in response to receiving one or more control signals from the control module 120.

The first switch module 114 may be configured to provide periodic windowing of outputs according to an asymmetrical duty cycle. In this embodiment, the first switch module 114 may output to an empty channel 145, a first light signal received from the first light source 112. The first light signal may be output to the empty channel 145 for a first time interval. The first switch module 114 may receive a second light signal from the second light source 116 during a second time interval and be configured to be able to output the second light signal to the channel 145 during the second time interval. The duration of the second time interval may be different from the duration of the first time period. Further, the first time interval and the second time interval may be non-overlapping.

The second switch module 118 may be an optical switch. In exemplary embodiments, the second switch module 118 may be a 1×1 optical switch. The second switch module 118 may output the second light signal to the first switch module 118 for output to the empty channel 145 during a third time interval. The third time interval may be less than the second time interval. In exemplary embodiments, the second switch module 118 may be a mechanism configured to receive the second light signal and/or a control signal from the control module 120, and/or output the received second light signal in response to receiving the control signal. In some embodiments, the second switch module 118 is not controlled by the control module 120 and may receive and/or output the second light signal without receiving a control signal from the control module 120. The second switch module 118 may output the second light signal to the first switch module 114.

Wavelength scanning of the empty channel 145 in the in-service WDM system may be provided in a manner that reduces the chance that the in-service WDM system 130 will become unstable due to changes in power in the WDM system 130. Advantageously, the second time interval may be a duration wherein a channel power monitoring function of the empty channel is not triggered. Accordingly, the likelihood that the in-service WDM system 130 will perform rapid and repeated gain adjustment, which tends to lead to instability, is reduced.

The testing output module 150 may include a splitter 152, third switch module 154, clock recovery module 156 and a signal analyzer 158. Splitter 152 may be communicatively coupled to a third switch module 154 and the clock recovery module 156. The clock recovery module 156 may be communicatively coupled to the third switch module 154. The third switch module 154 may be communicatively coupled to the signal analyzer 158.

The splitter 152 may be configured to receive an output test signal indicative of the second light signal and the characteristics of the channel through which the second light signal was transmitted. In exemplary embodiments wherein the first light signal and the second light signal are transmitted on the same empty channel 145, output test signal may receive information be indicative of the first light signal and/or the second light signal, as well as the characteristics of the empty channel 145 through which the second light signal was transmitted. The output test signal may be indicative of the first light signal and the second light signal when the splitter 152 receives the output test signal during a time interval that spans a portion of the time intervals during which the first light signal and the second light signal are output to the empty channel 145.

The splitter 152 may split the output test signal between the third switch module 154 and the clock recovery module 156.

The clock recovery module 156 may be configured to receive and process the signal transmitted from the splitter 152 to generate a clock pulse. The clock pulse may be indicative of the time during which the portion of the signal corresponding to the second light signal is received. The clock pulse may be output to the third switch module 154.

The third switch module 154 may be configured to receive the output test signal from the splitter 152 and receive the clock pulse from the clock recovery module 156. In response to receiving the clock pulse, the third switch module 154 may output to the signal analyzer 158 the portion of the output test signal corresponding to the second light signal.

The signal analyzer 158 may be configured to receive the second light signal and/or analyze one or more parameters of the empty channel 145 based on the second light signal that may be received. The signal analyzer 158 may be a fiber characteristics analyzer. Examples of parameters of an empty channel 145 that may be measured may include, but are not limited to, chromatic dispersion, PMD, pass band shape, OSNR, latency and/or other parameters that measure the performance of an in-service WDM channel.

Accordingly, in exemplary embodiments, wherein the output test signal is indicative of the second light signal and the empty channel 145, the signal analyzer 158 receives the entire output test signal. In exemplary embodiments wherein the output test signal is indicative of the first light signal, second light signal and the empty channel 145, the signal analyzer 158 receives the portion of the output test signal indicative of the second light signal and the empty channel 145. In exemplary embodiments wherein the output test signal is indicative of the first light signal and the empty channel 145, the signal analyzer 158 does not receive a signal. Therefore, the signal analyzer 158 may measure the channel parameter based on the second light signal, which is used for testing the empty channel 145. By contrast, the first light signal may be used to provide a minimum amount of power wherein the empty channel 145 receiving the first light signal may become or remain unblocked for testing of the channel.

The WDM system 130 may be a WDM system configured to receive the first light signal configured to cause an empty channel 145 to become or remain unblocked; receive a second light signal on the empty channel 145; and output an output test signal for testing the empty channel 145. The empty channel 145 that receives the second light signal may be the same channel or a different channel from that on which the first light signal is received. In the embodiment shown, the WDM system 130 may include: a fiber link 147 containing an empty channel 145 and a lit channel (not shown), one or more input network elements 132, one or more channel input ports 144, one or more channel output ports 146, an input WDM channel multiplexer ("WDM Mux") 134, an optical amplifier 138, an output WDM channel demultiplexer ("WDM DeMux") 140 and an output network element 142.

Each of the one or more input network elements 132 may be communicatively coupled to one or more channel input ports 144 of the WDM Mux 134. The WDM Mux 134 may be communicatively coupled to the fiber link 147, which may be communicatively coupled to the optical amplifier 138. The fiber link 147 may also be communicatively coupled to the WDM DeMux 140. The WDM DeMux 140 may be communicatively coupled, through one or more channel output ports 146, to the one or more output network elements 142.

Each of the input network elements 132 may include a transmitter, transceiver or another module configured to transmit a light signal to a lit channel (not shown). The WDM Mux 134 may be configured to receive a light signal from a transmitter, for example. The WDM Mux 134 may also be configured to receive from the first switch module 114, a first light signal and/or a second light signal. The first light signal and/or the second light signal may be provided to the empty channel 145.

The WDM Mux 134 may multiplex the received first light signal and/or second light signal and provide the multiplexed signal to an empty channel 145. The optical amplifier 138 may be configured to amplify power on the empty channel 145 and/or the lit channel (not shown).

In exemplary embodiments, the WDM DeMux 140 may demultiplex a received first light signal and/or second light signal and provide the received signal to the testing output module 150.

Figure 2:
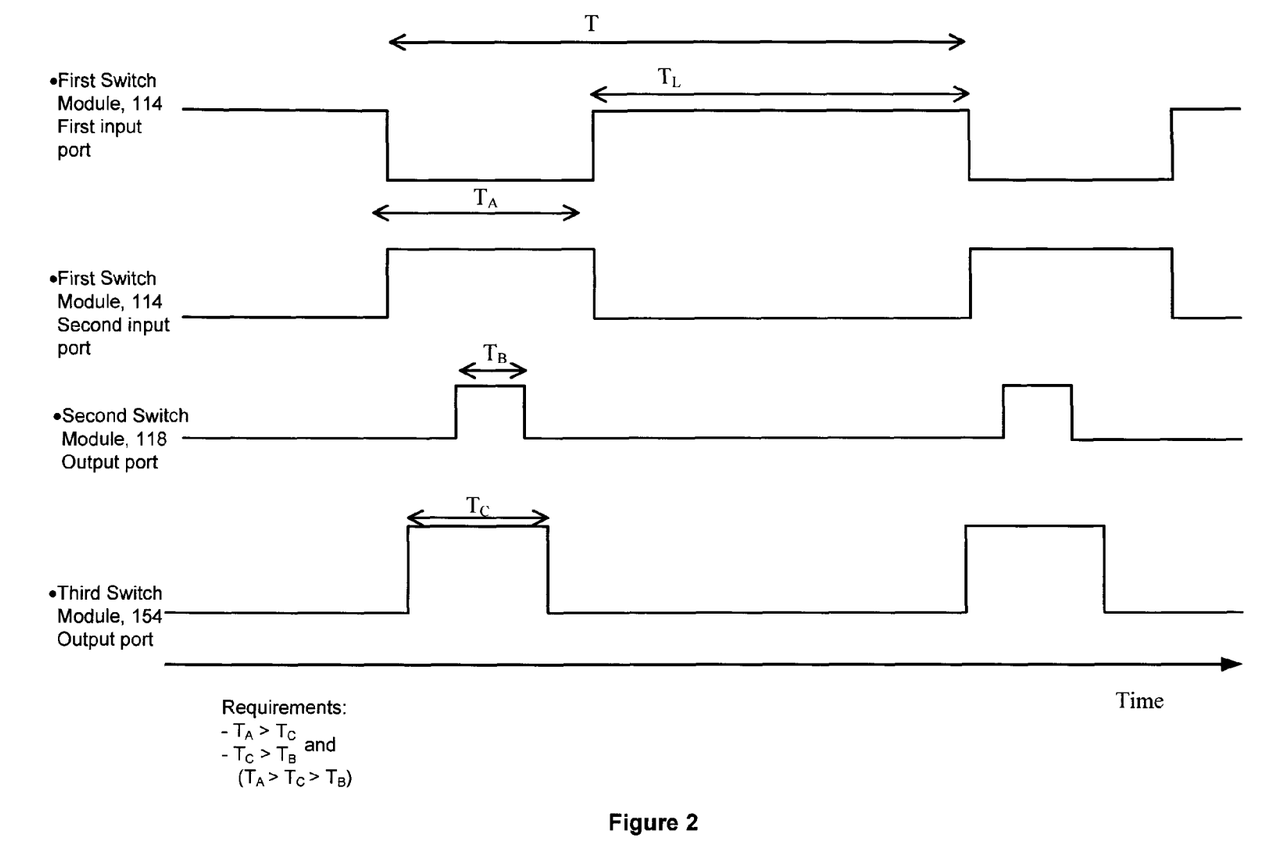
FIG. 2 is a chart illustrating a time relationship between switch modules associated with a testing input module and a testing output module in accordance with exemplary embodiments.

FIG. 2 is a chart illustrating a time relationship between switch modules associated with a testing input module and a testing output module in accordance with exemplary embodiments. With reference to FIGS. 1 and 2, in exemplary embodiments, the control module 120 may control the operation of the first switch module 114 and/or the second switch module 116. The clock recovery module 156 may control the operation of the third switch module 154.

The first switch module 114 may be configured to operate according to an asymmetric duty cycle. The duty cycle may be such that the first switch module 114 outputs to the WDM system 130 the first light signal during the first time interval, and is configured to be able to output to the WDM system 130 the second light signal during the second time interval.

In exemplary embodiments, the first switch module 114 operates with a period, T, where $T=T_L+T_A$. $T_L$ may be a duration of a first time interval over which the first light signal is output to the channel, and $T_A$ may be a duration of a second time interval during which the first switch module 114 may have an open output port and may be able to output the second light signal to the channel. A first port (not shown) of the second switch module 118 may be communicatively coupled to the second light source 116. The second switch module 118 may receive from the second light source 118 and output to the first switch module 114, the second light signal for a third time interval, $T_B$. Accordingly, while $T_A$ may be a duration of time during which the first switch module 114 may be configured to output the second light signal, the first switch module 114 may actually output the second light signal during the second time interval $T_B$, where $T_A>T_B$.

The control module 120 may control the first switch module 114 and/or the second switch module 116 such that $T_A>T_B$. Accordingly, the second light signal may be output to and/or received by the channel only for duration $T_B$. The first time interval, $T_A$, may be of a short duration relative to $T_L$ such that a channel power monitoring function of the WDM system may be not triggered and/or the gain may not be adjusted thereby minimizing the risk of instability in the system. The channel power monitoring function may not be triggered and/or the gain may not be adjusted if the duration of the first time interval is short enough to avoid detection by the optical amplifier 138. In various embodiments, the maximum duration for first time interval, $T_A$, such that a channel power monitoring function of the WDM system may be not triggered and/or the gain may not be adjusted thereby minimizing the risk of instability in the system may vary by the design of the WDM system 130. In exemplary embodiments, a minimum duration of time required to trigger the channel power monitoring function and/or cause the gain to be adjusted in the WDM system 130 may be a value within a range from 0.1 ms to 10 ms as dictated by the system design. Accordingly, the first time interval, $T_A$, must be less than this minimum duration of time. For example, in designs wherein the optical amplifier 138 is a two-stage long-wavelength-band erbium-doped fiber amplifier ("L-Band EDFA"), the L-Band EDFA may adjust the gain after a first time interval having a duration of about 105 μs or 260 μs, when one out of eight channels or seven out of eight channels, respectively, are dropped and the L-Band EDFA in the system is well saturated. These duration values may be respectively four and five times larger than what is observed with a C-Band EDFA. The difference may be explained by the different intrinsic saturation power in these two bands.

The first switch module 114 and/or the second switch module 118 may be designed to operate such that $T_A>T_B$ to provide a time guard between outputting the first light signal and/or the second light signal to the channel.

The input port (not shown) communicatively coupling the third switch module 154 and outputting the output test signal to the signal analyzer 158 for a third time interval, $T_C$. In some embodiments, to reduce the dispersion impact to the output test signal, the relationship between the time intervals may be $T_A>T_C$. Further, in some embodiments, to aid in improving the dispersion property of the output test signal, the relationship between time intervals may be $T_C>T_B$. Accordingly, in exemplary embodiments, the operation of the first switch module 112, second switch module 116 and/or third switch module 154 may be such that $T_A>T_C>T_B$.

In exemplary embodiments, $T=1\times10^3$ μs; $T_A=10$ μs; and $T_L\sim1\times10^3$ μS. Accordingly, the predominate portion of the time, the empty channel 145 may receive the first light signal. Therefore, the empty channel 145 may have a fairly constant power over the predominate portion of the time, T. Because the time interval during which the second light signal is received is small, the WDM system 130 may not notice a change in power during the second time interval. In this regard, testing using the second light signal may be performed on the empty channel 145 while reducing the likelihood that the WDM system 130 will notice a change in power and adjust gain for the same.

In exemplary embodiments, $T_B=5$ μs and $T_C=7.5$ μs. An edge of a pulse for opening a port of the first switch module 114, the second switch module 118 and/or the third switch module 154 may be approximately 1 ns. Accordingly, in the aforementioned embodiment, receiving a second light signal may be performed over a time interval on the order of milliseconds.

Figure 2A:
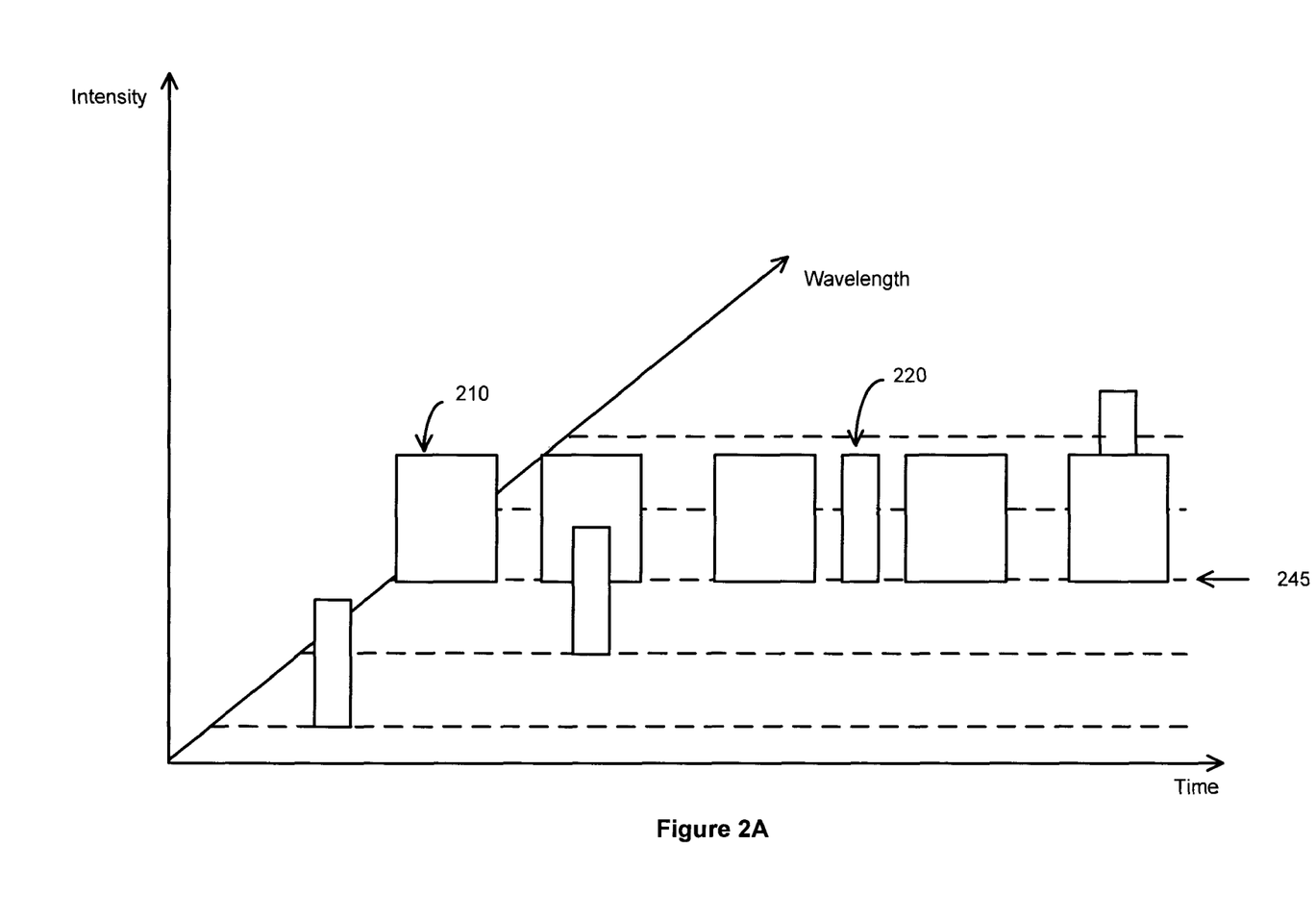
FIG. 2A is a chart illustrating a time-wavelength-intensity relationship between a first light signal and a second light signal received for testing an in-service WDM system in accordance with exemplary embodiments.

FIG. 2A is a chart illustrating a time-wavelength-intensity relationship between a first light signal and a second light signal received for testing an in-service WDM system in accordance with exemplary embodiments. With reference to FIGS. 1 and 2A, the first light signal 210 may be output from the first light source 112. In the embodiment shown, the first light source 112 may be configured to output the first light source 112 at a fixed wavelength. For example, the first light source 112 may be a fixed wavelength light source. The first light signal 210 may be received on an empty channel 245 having a wavelength corresponding to the wavelength of the first light signal 210. Accordingly, because the first light source 112 may be a fixed wavelength light source, the first light signal 210 may be received on the same channel 245 over time. The intensity of the first light signal 210 may correspond to at least a minimum amount of power such that the empty channel 245 receiving the first light signal may become or remain unblocked in response to receiving the first light signal 210.

The second light signal 220 may be output from the second light source 116. In the embodiment shown, the second light source 116 may be configured to output the second light source 116 at a plurality of wavelengths. For example, the second light source 116 may be a tunable wavelength light source configured to be tuned to provide the second light signal 220 at a wavelength selected from a plurality of wavelengths. The second light signal 220 may be received on the empty channel 245 corresponding to the wavelength to which the second light source 116 is tuned at a selected point in time. The second light signal 220 may be received for a time interval having a duration such a channel power monitoring function of the WDM system may not be triggered.

In the embodiment shown, the second light signal 220 may also be received on the empty channel 245 that receives the first light signal 210 in order to test the empty channel 245.

Figure 3:
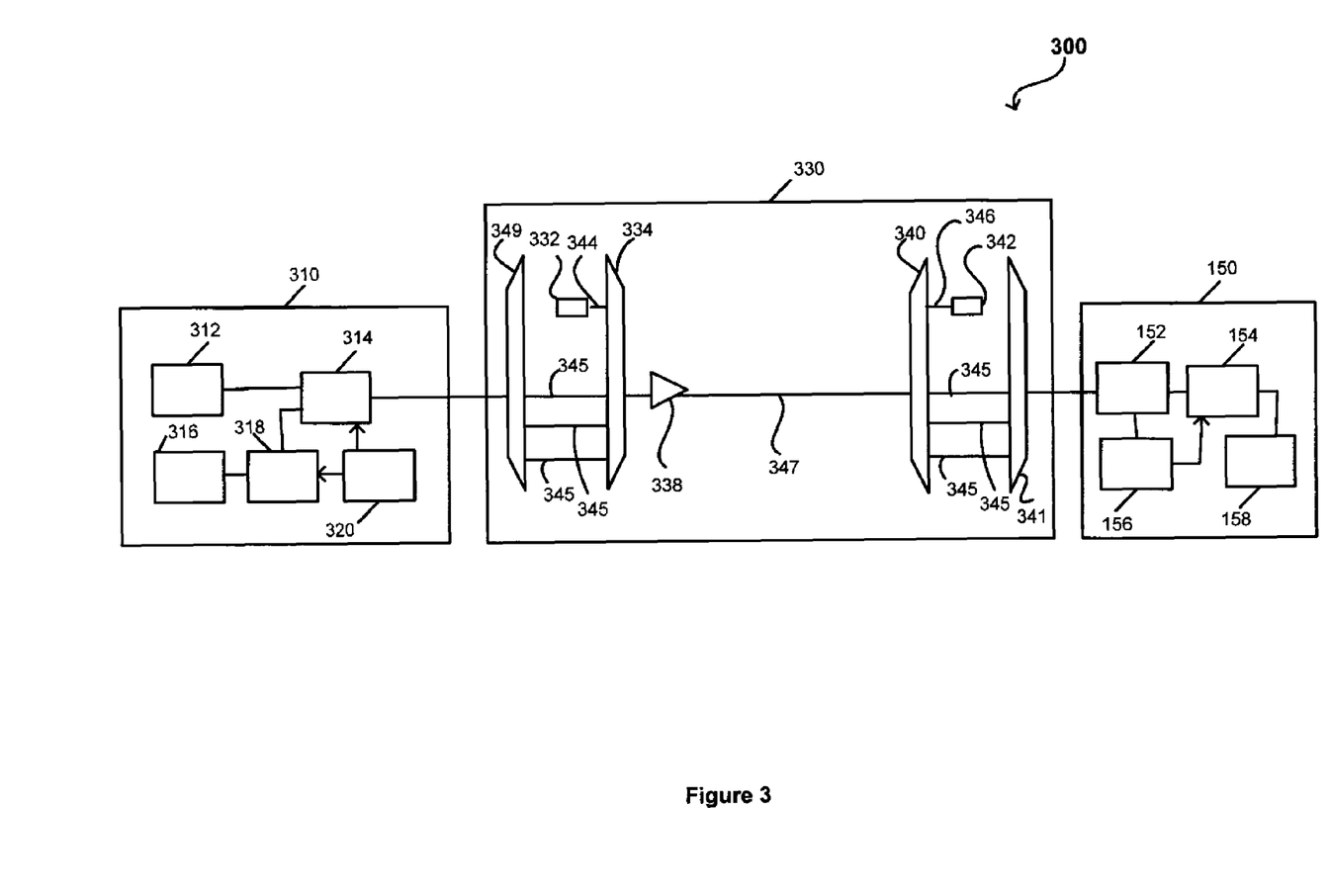
FIG. 3 is a schematic diagram of a WDM-TS in accordance with other exemplary embodiments.

FIG. 3 is a schematic diagram of a WDM-TS in accordance with exemplary embodiments. It should be understood that the WDM-TS 300 shown in FIG. 3 depicts a simplified view and/or may include additional elements that are not depicted. The WDM-TS 300 may provide sequential or simultaneous wavelength scanning of multiple empty channels 345 in a WDM system 330. One or more parameters of the empty channels 345 may be measured to determine the performance of the WDM system 330. Examples of parameters of an empty channel 345 that may be measured may include, but are not limited to, chromatic dispersion, polarization mode dispersion ("PMD"), pass band shape, optical signal-to-noise radio ("OSNR"), latency and/or other parameters that measure the performance of an in-service WDM channels.

With reference to FIG. 3, in the embodiment shown, the WDM-TS 300 may include a testing input module 310, a WDM system 330, and the testing output module 150. The testing input module 310 may be communicatively coupled to an input (not shown) of the WDM system 330 and the testing output module 150 may be communicatively coupled to an output (not shown) of the WDM system 330. The testing input module 310 may include a first light source 312, a second light source 316, a first switch module 314, a second switch module 318 and a control module 320.

Embodiments of the WDM-TS 300 may differ according to the manner in which the first light source is configured.

In one exemplary embodiment, the first light source 312 may be configured to be a tunable wavelength light source. The tunable wavelength light source may be configured to be tuned to sequentially emit first light signals each having one of a number of possible selected wavelengths. The selected wavelength may vary based on the tuning of the first light source 312. Accordingly, the first light signal may be output from the tunable wavelength light source and sequentially received by different empty channels 345. The second light source 316 may be a tunable light source to provide a second light signal at one of a number of possible selected channels over time.

Figure 3A:
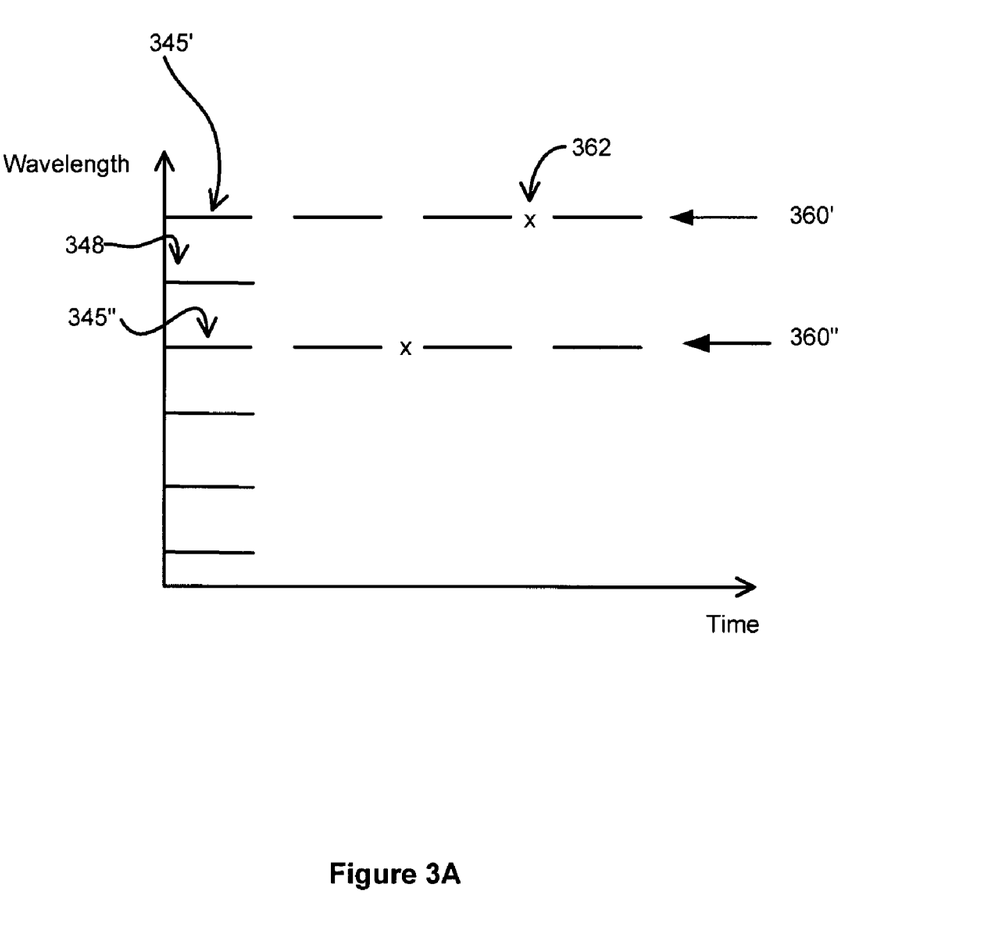
FIG. 3A is a chart illustrating a time-wavelength relationship between a plurality of first light signals and a second light signal in accordance with other exemplary embodiments.

In another exemplary embodiment, the first light source 312 may be configured to be a fixed multi-wavelength light source. FIG. 3A is a chart illustrating a time-wavelength relationship between the signals emitted from the fixed multi-wavelength light source and a second light source in accordance with other exemplary embodiments. With reference to FIGS. 1, 3 and 3A, the fixed multi-wavelength light source may be configured to emit a first light signal simultaneously having multiple wavelengths 360', 360" corresponding to multiple empty channels 345', 345". The intensity of the first light signal provided to the wavelengths 360', 360" may be of a magnitude wherein, in response to receiving the first light signal, the WDM system 330 causes the empty channels 345', 345" to become or remain unblocked. The second light source 316 may be a tunable light source to provide a second light signal 362 at one of a number of selected channels over time. The WDM system 330 may also include lit channel 348.

Referring back to FIG. 3, with either of the aforementioned embodiments of the first light source 312, the second light source 316 may be configured to provide a second light signal to the one or more empty channels 345. In exemplary embodiments, the second light signal may be an input test signal. The second light source 316 may be configured to be tuned to output light corresponding to one or more wavelengths. The second light signal may be tuned to have a wavelength corresponding to the one or more wavelengths of the first light signal after the first light signal is provided to the one or more empty channels 345. Accordingly, the first light signal and/or the second light signal may be received on the same one or more empty channels 345 of the in-service WDM system 330. Wavelength scanning may be performed on the one or more empty channels 345 when the one or more empty channels 345 receive the second light signal. The second light signal may be used to test one or more parameters of the one or more empty channels 345.

The control module 320 may be a module configured to output one or more control signals to the first switch module 314 and/or the second switch module 318 for controlling the periodic windowing function of the first switch module 314 and/or the second switch module 318. The periodic windowing function may be indicative of the time periods during which the first switch module 314 outputs the first light signal and/or the second light signal to the WDM system 330, and/or the time interval during which the second switch module 318 outputs the second light signal to the first switch module 314.

The first switch module 314 may be a mechanism configured to receive the first light signal and/or the second light signal and output the received first light signal and the received second light signal. The first switch module 314 may be an optical switch. The first switch module 314 may be a 2×1 optical switch. In this embodiment, the two input ports (not shown) may be configured to receive the output from the first light source 312 and the second switch module 318 and the output port may be configured to output to the WDM system 330 the received outputs from the first light source 312 and the second switch module 318. The first switch module 314 may be controlled to receive the first light signal and/or the second light signal and output the same in response to receiving one or more control signals from the control module 320.

The first switch module 314 may be configured to provide periodic windowing of outputs according to an asymmetrical duty cycle. In this embodiment, the first switch module 314 may output to one or more empty channels 345, a first light signal received from the first light source 312. The first light signal may be output to the one or more empty channels 345 for a first time interval. The WDM system 330 may cause the one or more empty channels 345 to become or remain unblocked based on the intensity of the first light signal that may be received at the one or more empty channels 345. The first switch module 314 may receive a second light signal from the second light source 316 during a second time interval and be configured to be able to output the second light signal to the one or more empty channels 345 during the second time interval. The duration of the second time interval may be different from the duration of the first time period. Further, the first time interval and the second time interval may be non-overlapping.

The second switch module 318 may be an optical switch. In exemplary embodiments, the second switch module 318 may be a 1×1 optical switch. The second switch module 318 may output the second light signal to the first switch module 318 for output to the one or more empty channels 345 during a third time interval. The third time interval may be less than the second time interval. In exemplary embodiments, the second switch module 318 may be a mechanism configured to receive the second light signal and/or a control signal from the control module 320, and/or output the received second light signal in response to receiving the control signal. In some embodiments, the second switch module 318 is not controlled by the control module 320 and may receive and/or output the second light signal without receiving a control signal from the control module 320. The second switch module 318 may output the second light signal to the first switch module 314.

Wavelength scanning of the one or more empty channels 345 in the in-service WDM system may be provided in a manner that reduces the chance that the in-service WDM system 330 will become unstable due to noticed changes in power in the one or more empty channels 345. Advantageously, the second time interval may be a duration wherein a channel power monitoring function of the one or more empty channels 345 is not triggered. Accordingly, the likelihood that the in-service WDM system 330 will perform rapid and repeated gain adjustment, which tends to lead to instability, is reduced.

The testing output module 150 may be configured with the structure and function described with reference to FIG. 1.

Referring back to FIG. 3, the WDM system 330 may be a WDM system configured to receive the light corresponding to the one or more wavelengths of the first light signal. In embodiments wherein the first light source 312 is a tunable light source, the in-service WDM system 330 may receive on a first empty channel 345, a first light signal having a first wavelength. The in-service WDM system 330 may sequentially receive other first light signals having other wavelengths. In embodiments wherein the first light source 312 is a multi-wavelength light source, the in-service WDM system 330 may receive on multiple empty channels 345, first light signals having selected wavelengths. The in-service WDM system 330 may simultaneously receive the first light signals on the empty channels 345.

The one or more empty channels 345 may: receive the first light signal for causing the one or more empty channels 345 to become or remain unblocked; receive a second light signal on the same one or more empty channels 345; and output an output test signal for testing the one or more empty channels 345.

As described with reference to FIG. 1, the first light signal may be received during a first time interval, the second light signal may be able to be received during a second time interval but may actually be received during a third time interval, and the output test signal may be received during a fourth time interval. As described with reference to FIG. 1, the first time interval and the second time interval may be non-overlapping time intervals and the second time interval may be a duration wherein the channel monitoring function for the one or more empty channels 345 is triggered. Further, as also described with reference to FIG. 1, the second time interval is less than the first time interval and is greater than the third time interval. The fourth time interval is greater than the third time interval but less than the second time interval.

Referring back to FIG. 3, in the embodiment shown, the WDM system 330 may include: a fiber link 347 containing an empty channel 345 and a lit channel (not shown), one or more input network elements 332, an input WDM channel multiplexer ("WDM Input Mux") 334, channel input port 344, channel output port 346, an input WDM channel demultiplexer ("WDM Input DeMux") 349, an optical amplifier 338, an output WDM channel demultiplexer ("WDM Output DeMux") 340, an output WDM channel multiplexer ("WDM Output Mux") 341 and an output network element 342.

Each of the one or more input network elements 332 may be communicatively coupled to the WDM Input DeMux 349. The WDM Input DeMux 349 may receive a first light signal from the first switch module 314 and/or provide the first light signal to one or more empty channels 345 and corresponding to the one or more wavelengths of the first light signal.

The WDM Input DeMux 349 may transmit to the WDM Input Mux 334 the one or more demultiplexed first light signals. The second light signal may also be demultiplexed onto one or more empty channels 345 sequentially or simultaneously. The WDM Input Mux 334 may receive and multiplex the one or more first light signals and/or the one or more second light signals. In exemplary embodiments, the one or more second light signals may be multiplexed onto the same empty channels 345 as the one or more first light signals to sequentially or simultaneously measure the performance of one or more empty channels 345.

The WDM Input Mux 334 may be communicatively coupled to the fiber link 347, which may be communicatively coupled to the optical amplifier 338. The optical amplifier 338 may be communicatively coupled to the WDM Output DeMux 340. The WDM Output DeMux 340 may receive from the one or more empty channels 345 on which the second light signals was transmitted, one or more output test signals. The WDM Output DeMux 340 may transmit the received one or more output test signals to the WDM Output Mux 341. The WDM Output Mux 341 may multiplex the received signals thereby creating a combined output test signal. The received signals may be a plurality of first light signals and/or second light signals or portions thereof.

In this embodiment, the WDM Mux 341 may provide to the testing output module 150 the combined output test signal.

Accordingly, the WDM-TS 300 may provide sequential or simultaneous measurement of a plurality of empty channels without the need to have a first switch module 114 with multiple output ports. Further, the WDM-TS 300 may provide measurement of parameters that are more reliable when a plurality of empty channels 345 are measured simultaneously.

Figure 4:
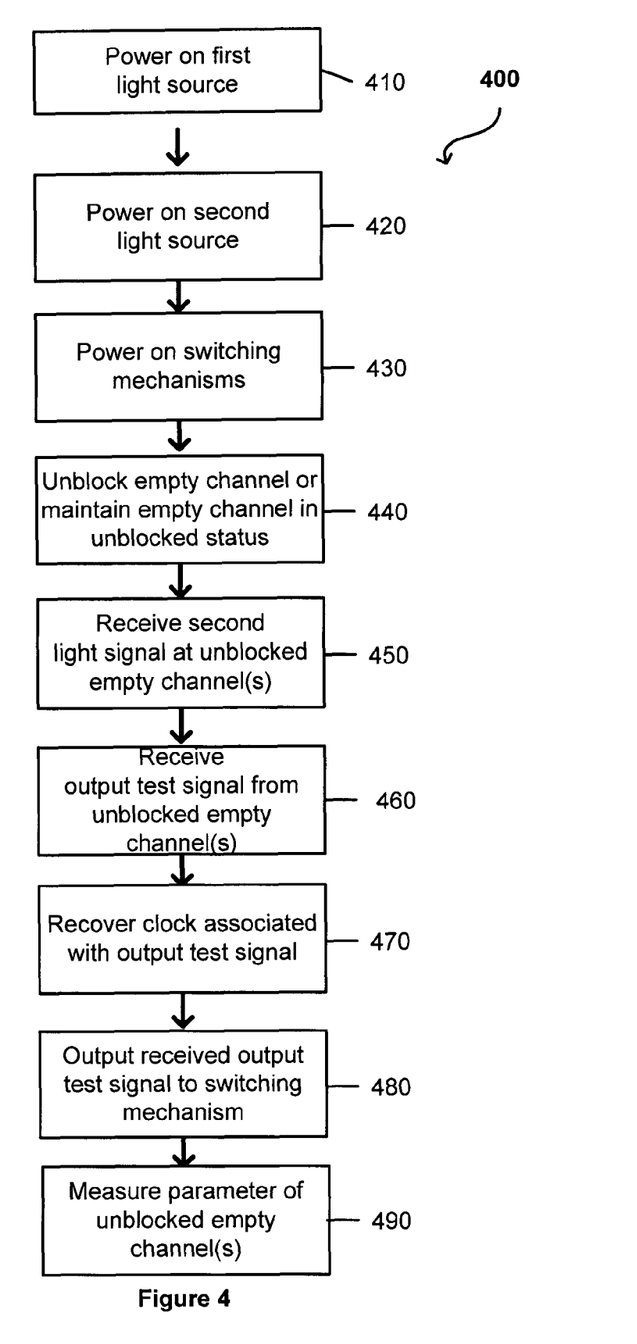
FIG. 4 is a flow chart illustrating a method for providing scanning measurements in accordance with exemplary embodiments.

With reference to FIGS. 1 and 4, method 400 may be performed as follows. It is understood that the method 400 may be extended to the structure of FIG. 3 as well. FIG. 4 represents an exemplary embodiment and may be not meant to be limiting. In particular, the method 400 may be executed or otherwise performed by one or a combination of various method steps. The method 400 and/or its steps are not limited to any particular type of structure, whether hardware, software or a combination of hardware and software. With regard to hardware, the method 400 may be performed by analog or digital circuitry such as that found in any number of devices, including, but not limited to, integrated circuits. With regard to software, one or more steps of the method 400 may be performed by a computer-readable medium having an executable computer program for performing the steps of the methods described herein.

In block 410, a first light source configured to generate a first light signal of a selected wavelength may be powered on. Each first light signal may be a fixed wavelength light signal. The wavelength may be a wavelength corresponding to one or more empty channels 145. For example, the first light source 112 may be powered on.

In block 420, a second light source configured to generate a second light signal may be powered on. The second light source may be configured to be tunable to output the second light signal at one or more different wavelengths. The wavelength may be a wavelength corresponding to a channel of a WDM system 130. For example, the second light source 116 may be powered on.

In block 430, one or more switching mechanisms configured to output the first light signal and/or the second light signal according to a periodic windowing function may be powered on. For example, the switching mechanisms may be the first switching module 114 and/or the second switching module 118.

In block 440, the first light signal may be received and, in response to receiving the first light signal, an empty channel may become or remain unblocked. For example, the empty channel 145 may receive the first light signal from the first light source 114 powered on in block 410, and the power of the first light signal may be determined by the optical amplifier 138. The optical amplifier 138 may unblock the one or more empty channels based on the channel power monitoring function of the optical amplifier 138.

In block 450, the second light signal may be received at one or more of the unblocked empty channels. For example the second light signal may be received at the one or more empty channels 145 from the second light source 116 powered on in block 420. The first light signal may be received during a first time interval, and the second light signal may be received during a second time interval. The first time interval and the second time interval may be non-overlapping time intervals, and the second time interval may be a duration wherein a channel power monitoring function of the empty channel 145 is not triggered.

In block 460, an output test signal may be received. For example, the output test signal may be received by the splitter 152. The output test signal may have substantially the same information content of the second light signal but may be modified due to variations in the power of the second light signal due to imperfections in the one or more empty channels 345.

In block 470, the clock of the periodic windowing function associated with the output test signal may be recovered. For example, the clock may be recovered by the clock recovery module 156 in response to receiving the output test signal.

In block 480, the received output test signal may be output to a switching mechanism. For example, the switching mechanism may be the third switch module 154, which may be controlled by the clock pulse from the clock recovery module 156 in order to output the output test signal.

In block 490, the output test signal may be received and measured to measure a parameter of the unblocked empty channel 145 to which the second light signal was provided. For example, the output test signal may be output from the third switch module 154 and received and measured by the signal analyzer 158. The output test signal may be received by the signal analyzer 158 from the third switch module 154 when the third switch module 154 outputs the output test signal in response to received information indicative of the recovered clock signal.

Figure 5:
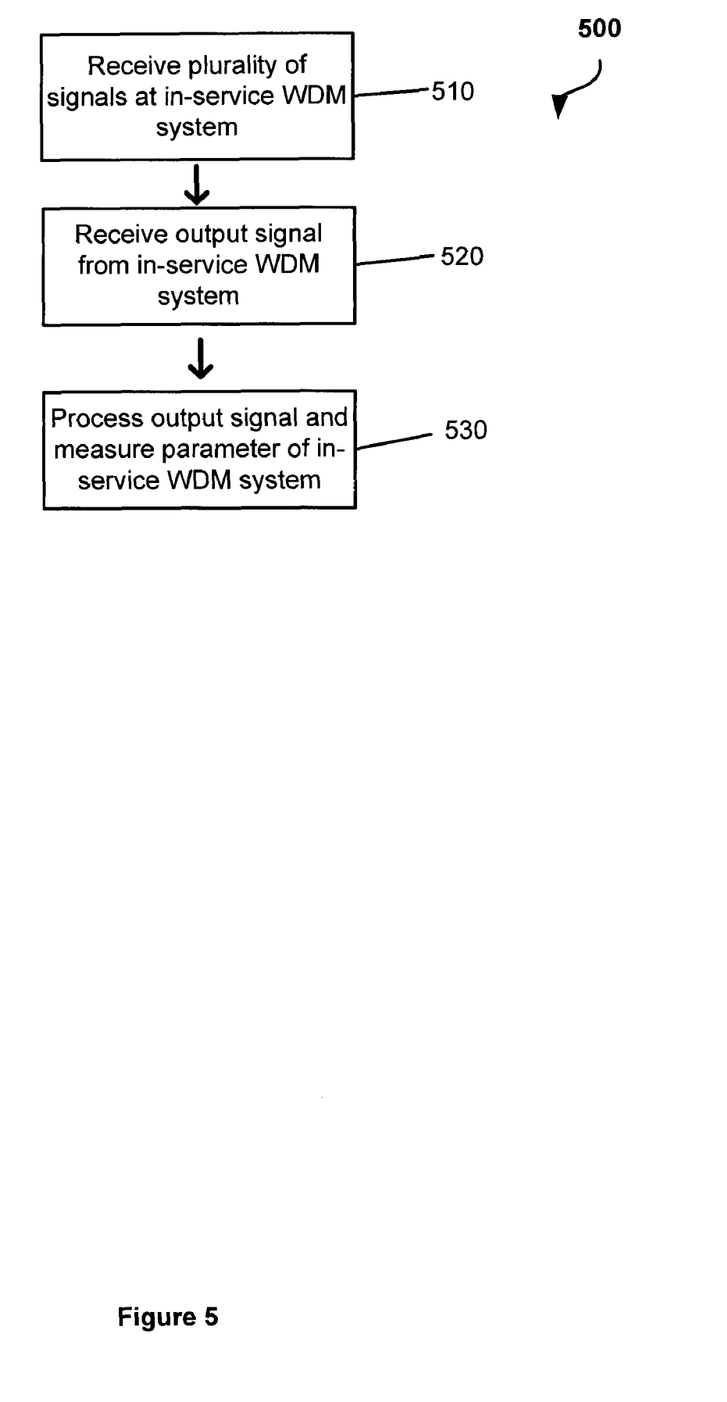
FIG. 5 is a flow chart illustrating a method for testing a fiber link of an in-service WDM system.

FIG. 5 is a flow chart illustrating a method for testing an in-service WDM system. With reference to FIGS. 1 and 5, method 500 may be performed as follows. It is understood that the method 500 may be extended to the structure of FIG. 3 as well. FIG. 5 represents an exemplary embodiment and may be not meant to be limiting. In particular, the method 500 may be executed or otherwise performed by one or a combination of various method steps. The method 500 and/or its steps are not limited to any particular type of structure, whether hardware, software or a combination of hardware and software. With regard to hardware, the method 500 may be performed by analog or digital circuitry such as that found in any number of devices, including, but not limited to, integrated circuits. With regard to software, one or more steps of the method 500 may be performed by a computer-readable medium having an executable computer program for performing the steps of the methods described herein.

In block 510, a plurality of signals may be received. For example, a first light signal and a test signal may be received at a fiber link 147 of an in-service WDM system 130. The first light signal may be configured to cause an empty channel 145 of the fiber link 147 to become or remain unblocked. The test signal may be configured for testing the WDM system 130. Further, the test signal may be of a duration such that a channel power monitoring function of an optical amplifier 138 of the fiber link 147 is not triggered and/or the gain of the optical amplifier 138 is not adjusted.

In block 520, an output signal indicative of the test signal and indicative of the WDM system may be received. For example, the output signal may be received at the testing output module 150 from the fiber link 147 of the WDM system 130.

In block 530, the output signal may be processed to measure a parameter of the WDM system. For example, the output signal may be processed in the testing output module 150.

In the preceding specification, various exemplary embodiments have been described with reference to the accompanying drawings. It will, however, be evident that various modifications and/or changes may be made thereto, and/or additional embodiments may be implemented, without departing from the broader scope of the invention as set forth in the claims that follow. The specification and/or drawings are accordingly to be regarded in an illustrative rather than restrictive sense.

What is claimed is:

1. A module comprising:
a first light source configured to emit a first light signal to one or more empty channels of an in-service Wavelength Division Multiplexing ("WDM") system;
a tunable second light source configured to emit a second light signal to the one or more empty channels to test the one or more empty channels; and
a first switch module configured to:
receive from the first light source and output to the one or more empty channels, the first light signal during a first time interval; and
receive from the second light source and output to the one or more empty channels, the second light signal during a second time interval, the second time interval being a duration wherein a channel power monitoring function of the in-service WDM system is not triggered; and
a testing output module configured to receive and analyze an output test signal, comprising:
a splitter configured to receive and output the output test signal;
a clock recovery module configured to receive the output test signal from the splitter and output a clock pulse indicative of a output time interval during which the output test signal is received;
a second switch module configured to, in response to receiving the clock pulse from the clock recovery module:
receive the output test signal from the splitter; and
output the output test signal during the output time interval; and a signal analyzer configured to analyze the output test signal.

2. The module of claim 1, wherein the first light signal is configured with a power wherein the one or more empty channels become or are maintained in an unblocked status in response to receiving the first light signal.

3. The module of claim 1, wherein the duration of the second time interval is less than a duration of the first time interval.

4. The module of claim 1, further comprising a control module configured to control the first switch module to output the first light signal and the second light signal during the first time interval and the second time interval, respectively.

5. The module of claim 4, further comprising a second switch module configured to receive from the second light source, the second light signal, and to be controlled by the control module to output to the first switch module, the second light signal during a third time interval.

6. The module of claim 5, wherein a duration of the third time interval is less than the duration of the second time interval.

7. The module of claim 1, wherein the first time interval and the second time interval are non-overlapping time intervals.

8. The module of claim 1, wherein the first light source is selected from a group consisting of a fixed wavelength light source, a multi-wavelength light source and a tunable light source.

9. A system comprising:
an in-service WDM system configured to receive one or more first light signals and one or more input test signals and to output an output test signal;
a testing input module configured to:
output to one or more empty channels of the in-service WDM system, the one or more first light signals, the one or more first light signals being output from a first switch module during a first time interval;
output to the one or more empty channels of the in-service WDM system, the one or more input test signals, the one or more input test signals being output from the first switch module during a second time interval to test the one or more empty channels of the in-service WDM system, the second time interval being a duration wherein a channel power monitoring function of the in-service WDM system is not triggered; and
a testing output module configured to receive and analyze the output test signal, comprising:
a splitter configured to receive and output the output test signal;
a clock recovery module configured to receive the output test signal from the splitter and output a clock pulse indicative of a output time interval during which the output test signal is received;
a second switch module configured to, in response to receiving the clock pulse from the clock recovery module:
receive the output test signal from the splitter; and
output the output test signal during the output time interval; and
a signal analyzer configured to analyze the output test signal.

10. The system of claim 9, wherein a power of the first light signal causes the one or more empty channels to become or to be maintained in an unblocked status in response to receiving the first light signal.

11. The system of claim 9, wherein the in-service WDM system simultaneously receives at, at least two of the one or more empty channels of the in-service WDM system, at least two of the one or more first light signals and at least two of the one or more input test signals, the first light signals being generated by a multi-wavelength first light source, and
wherein the output test signal is a signal indicative of a combined two or more input test signals after transmission through the in-service WDM system.

12. The system of claim 9, wherein the in-service WDM system
receives at a first of the one or more empty channels of the in-service WDM system, one of the one or more first light signals and one of the one or more input test signals, the one of the one or more first light signals being generated by a tunable first light source,
and wherein the in-service WDM system receives at a second of the one or more empty channels of the in-service WDM system, another one of the one or more first light signals and another one of the one or more input test signals, the other one of the one or more first light signals being generated by the tunable first light source, and
wherein the output test signal is a signal indicative of the one of the one or more input test signals or the other one of the one or more input test signals after transmission through the in-service WDM system.

13. The system of claim 9, wherein the signal analyzer is configured to analyze the output test signal to measure at least one of: a polarization mode dispersion, pass band shape, optical signal-to-noise radio or latency of one or more of the one or more empty channels of the in-service WDM system.

14. The system of claim 9, wherein the output time interval is greater than the third time interval and less than the first time interval and the duration of the second time interval.

15. A method comprising:
generating a first light signal;
generating a second light signal;
powering on one or more switching mechanisms configured to output to one or more empty channels, a first light signal and the second light signal;
receiving by the one or more empty channels, the first light signal;
receiving by the one or more empty channels, the second light signal for testing the one or more empty channels wherein the second light signal is received during a time interval of a duration configured to prevent triggering of a channel power monitoring function of an in-service WDM system;
receiving and outputting, at a splitter, an output test signal;
receiving, at a clock recovery module, the outputted test signal from the splitter and output a clock pulse indicative of a output time interval during which the output test signal is received;
receiving, at a second switch module, the output test signal from the splitter in response to receiving the clock pulse from the clock recovery module;
outputting the output test signal during the output time interval; and
analyzing, at a signal analyzer, the output test signal.

16. The method of claim 15, wherein the first light signal is received during a first time interval, the second light signal is received during a second time interval, the first time interval and the second time interval being non-overlapping time intervals, and the second time interval being a duration wherein a channel power monitoring function of the one or more empty channels is not triggered.

17. The method of claim 15, further comprising:
recovering a clock associated with the output test signal, wherein the output test signal is a modified version of the second light signal having a substantially same information content of the second light signal and the outputting of the output test signal is performed in response to information indicative of the recovered clock; and
measuring one or more parameters of the one or more empty channels.

18. The method of claim 17, wherein the one or more parameters of the one or more empty channels is at least one of: polarization mode dispersion, pass band shape, optical signal-to-noise radio or latency.

19. The method of claim 15, further comprising the one or more empty channels having an unblocked status in response to receiving the first light signal.

* * * * *